Oct. 18, 1927.

T. C. BLACK 1,646,135

DETACHABLE LINK

Filed June 16, 1927

T. C. BLACK.
Inventor

Patented Oct. 18, 1927.

1,646,135

UNITED STATES PATENT OFFICE.

THOMAS CAMPBELL BLACK, OF PORTLAND, OREGON.

DETACHABLE LINK.

Application filed June 16, 1927. Serial No. 199,309.

My invention relates to detachable links in which a gap in the link is bridged by a hingedly mounted lock-bar.

The objects of my invention are to provide a link, by means of which two or more eye members can be quickly and securely connected with each other.

Other objects and advantages are to be found in the construction and arrangement of parts as will be described in the specification and particularly pointed out in the appended claims.

Figure 1:
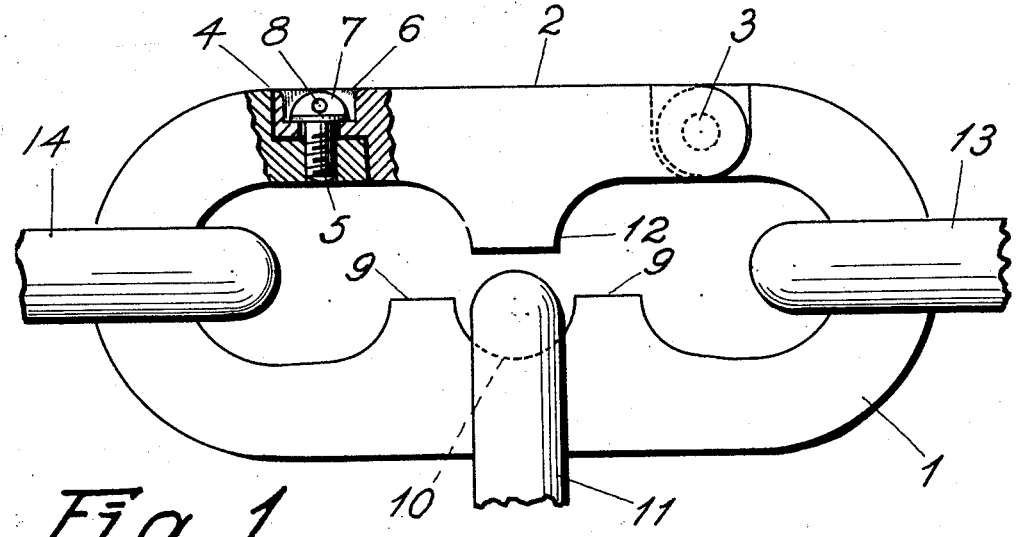

I attain these objects with the mechanism illustrated in the accompanying drawing, in which:

Fig. 1 may be termed a side view of my link.

Figure 2:
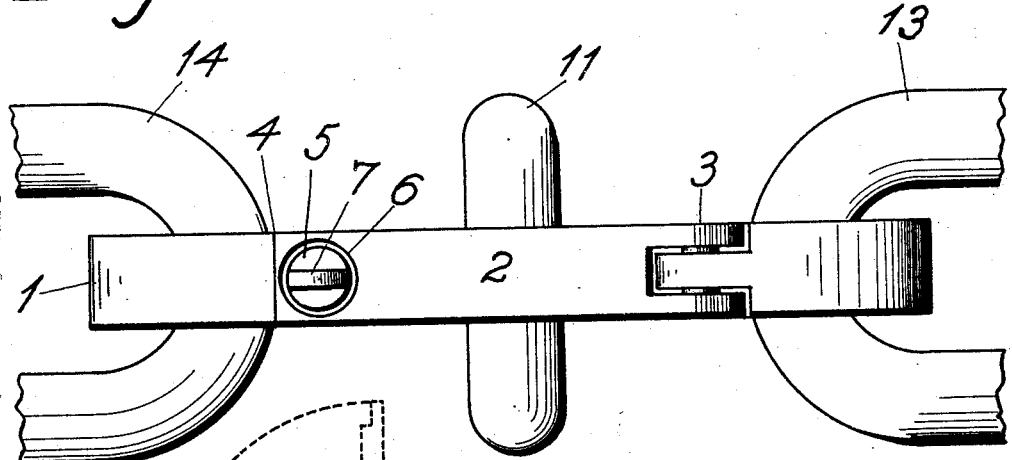

Fig. 2 would then represent a plan view.

Figure 3:
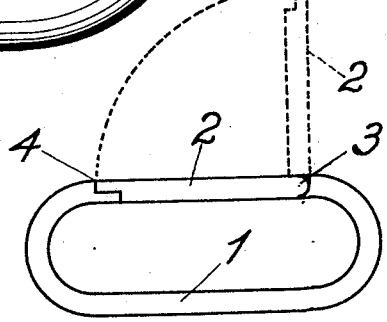

Fig. 3 is a side view of my link in its simplest form.

Similar numerals refer to similar parts throughout the several views.

The operation in logging known as "butt rigging" requires, besides other instrumentalities: a wing shackle, a main shackle, a bridge link schackle, and a bridge link—a very cumbersome, expensive, and in general, very unsatisfactory combination, especially on account of frequent breakage in these parts. My invention eliminates all these parts and furnishes one element by means of which the choker can be connected quickly and securely with the main-line and the haul-back-line. For this purpose I take a main member 1 of steel, preferably square in cross section and cast in the familiar form of a chain link, that is, both ends fully curved, but with a gap left in one side. This gap is bridged by a lock bar 2 whose one end is hinged to one end of the main member 1, as at 3, while the other end of the lock bar 2 is rabbeted to fit into a corresponding rabbet in the main members 1, as at 4. A thumb screw 5 holds the two rabbeted ends together. The hole 6 in the lock bar for the shoulder of the thumb screw 5 should be countersunk sufficiently so that the wing 7 will not project outside the link. A hole 8 in the wing 7 permits the insertion of a nail or other pointed instrument if the thumb screw 5 should work too hard for manipulation with the fingers.

Opposite the lock bar 2, at the inner surface of the main member 1, there are two ridges 9 in spaced relation to each other and directed toward the lock bar 2. The valley between the two ridges 9 forms an open bearing 10 for the eye 11 of the choker. To prevent the eye 11 of the choker from jumping its bearing 10, there is another ridge 12, but integrally projecting from the lock bar 2, and approaching the eye 11 of the choker close enough to retain said eye in place.

In operation the lock bar 2 is first swung open, then the eye 13 of the main line is inserted, thereupon the eye 11 of the choker and finally the eye 14 of the haul-back line, now the lock-bar 2 can be screwed into place and the link is ready for active service.

The ease with which this link can be handled makes its employment not only advantageous in connection with a choker, but also on many other occasions. For instance, during the operation known as "rigging up," it will permit yarding on both sides of the block; also, in shifting the donkey engine it will readily take the place of the cumbersome moving links; further, the wood line block can be attached with a minimum of effort. In fact, wherever two eyes or links require quick connection, this link can be used with safety and economy, though if the link is intended to be used for the latter purpose exclusively that is, without any choker, the ridges in the link can be very well omitted as shown in Fig. 3.

Having thus described my invention it will be seen that my objects have been accomplished and, though I have shown the preferred form of construction, I reserve to myself the right to make minor changes providing I do not contravene the spirit and principle of my invention.

I claim:

1. A detachable link, comprising a main member, a gap in one side of the main member, a lock bar bridging the gap in the main member, one end of the lock bar being hingedly affixed to the main member, the other end of the lock bar held to the main member by a thumb screw, and means to hold the eye of a choker swingingly in an open bearing midway between the curved ends of the link.

2. A detachable link, comprising a main member, a gap in one side of the main member, a lock-bar bridging the main member, a swingingly mounted lock bar bridging the gap and completing the continuity of the main member, two ridges at the inner surface of the main member, in spacial relation to each other and forming a valley, the two ridges being directed toward the lock bar, and a ridge extending from the lock bar directed toward the valley, between the two ridges on the link, and forming a cover for the valley.

In testimony whereof I affix my signature.

THOMAS C. BLACK.